Sept. 20, 1932.  R. ERBAN  1,878,272

FRICTION GEAR

Filed Oct. 31, 1930

INVENTOR.
RICHARD ERBAN.
BY
ATTORNEY.

Patented Sept. 20, 1932

1,878,272

UNITED STATES PATENT OFFICE

RICHARD ERBAN, OF VIENNA, AUSTRIA

FRICTION GEAR

Application filed October 31, 1930, Serial No. 492,475, and in Austria November 22, 1929.

My present invention relates to friction gears of the type in which rolling bodies are interposed between a pair of race rings for transmitting torque from one ring to the other, and has particular reference to improvements in automatic clamping devices for such gears.

It is known that in gears of the type mentioned, one or the other of the race rings thereof may, due to its elasticity, be deformed to compensate for wear on the race rings and on the rolling bodies, and to produce the necessary operating pressure of the rings against the rolling bodies. Moreover, means have been provided heretofore to effect deformation of a race ring of a gear of the type mentioned for the purposes mentioned, but so far as I am aware, no such means heretofore provided has proven entirely efficient and satisfactory in use.

The race ring deforming means heretofore provided have consisted, usually, either of systems of levers or arrangements of cooperating inclined surfaces. Invariably, however, the lever systems heretofore provided have been more or less complicated and therefore unsatisfactory from many different viewpoints, while the inclined surface arrangements have been found to be both difficult and expensive to produce, as well as to satisfactorily embody in a gear.

Accordingly, the general object of my present invention is to provide a practical race ring deforming means for friction gears, which means is of simple, inexpensive construction and embodies a minor number of parts which are compactly arranged and capable of being readily embodied in a gear, and which is thoroughly reliable and efficient in operation.

With the foregoing and other objects in view, which will become more fully apparent as the nature of my invention is better understood, the same consists in the novel features of construction and in the novel combination and arrangement of parts as will be hereinafter more fully described, illustrated in the accompanying drawing and defined in the appended claims.

In the drawing, wherein like characters of reference denote corresponding parts in related views.

Figure 1:
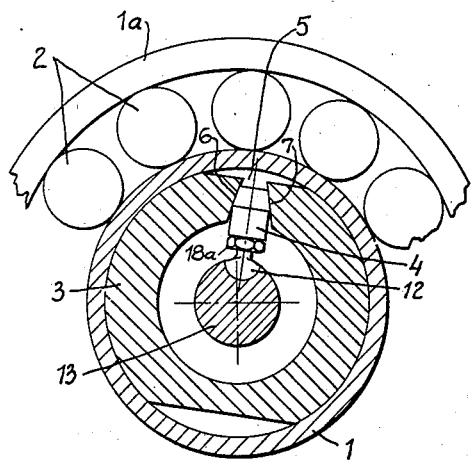
Figure 1 is a view, partly in elevation and partly in section, of a friction gear embodying race ring deforming means constructed and arranged in accordance with one practical embodiment of my invention.
Figure 2:
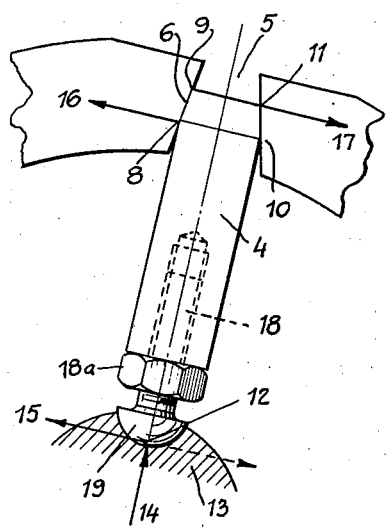
Figure 2 is an enlarged detail view of the lever arrangement shown in Figure 1.

Referring first to the embodiment of my invention illustrated in Figures 1 and 2 of the drawing, it will be observed that the friction gear is of a conventional design including inner and outer race rings designated as 1 and 1ª, respectively, between which are disposed rolling bodies 2 designed to transmit torque from one to the other of said rings.

According to the embodiment of my invention illustrated in Figures 1 and 2 of the drawing, the inner race ring 1 constitutes the driving ring and the ring 1ª the driven ring, the inner ring 1 therefore being adapted to be deformed; i. e., spread or expanded, to compensate for any wear which may occur on the rolling body engaging faces of the rings, and on the rolling bodies, as well as to produce the necessary pressure of the rings against the rolling bodies to render the gear efficiently operative.

The driving element of the gear consists in the present instance of a rotatable shaft 13 extending through the inner race ring 1, and in accordance with this embodiment of my invention, the means for deforming or expanding the ring 1 is interposed between said ring and said shaft and consists essentially of a shoe 3 and a cooperating lever 4.

The shoe 3 is disposed within the inner race ring 1 and is in the form of a split ring neatly fitting said race ring, the end surfaces 6 and 7 of said shoe, where the same is split as at 5, being flat and being disposed in outwardly converging spaced relation as shown.

The lever 4 is in the form of a bar of suitable width having the sides thereof at its outer end formed flat and converged outwardly for cooperation with the end surfaces 6 and 7 of the shoe 3, the said flat, converging side faces of said lever extending, respectively, from the opposite outer end side corners 9 and 11 of the lever inward, respectively, to the points 8 and 10, the lengths of the said converging or inclined faces of the lever being less than the lengths of the faces 6 and 7 of the shoe in the radial direction of the latter faces as indicated.

The outer end portion of the lever 4 is disposed between the ends 6 and 7 of the shoe 3 with the outwardly converged or inclined side faces of the lever disposed, respectively, in flat engagement with said end surfaces 6 and 7 of the shoe. Moreover, said lever extends normally in a radial direction with respect to the shaft 13 and the shoe 3 and the race rings, and at its inner end is formed with a central, longitudinal bore into which is threaded an adjustment screw 18, which latter extends inward beyond the inner end of the lever and is provided with a spherical head 19 seated in a corresponding recess in the side of the shaft 13. On the shank of the screw 18 is threaded a lock nut 18ᵃ for cooperation with the inner end of the lever 4 to secure said screw in any desired position of adjustment.

It will be obvious from the foregoing, by reason of the head 19 of the screw 18 bearing against the shaft 13, said screw may be rotatably adjusted relative to the lever 4 to force said lever longitudinally outward, which manifestly will result in a wedging action of the converged or inclined side faces of the lever against the end faces 6 and 7 of the shoe 3, with the result of spreading said shoe and thereby deforming or expending the inner race ring 1. Thus, by means of the screw 18, a normal, deforming or expanding tension may be applied to the inner race ring 1 to compensate for wear on the rolling body contacting surfaces of the race rings, and on the rolling bodies, as well as to impose any desired normal pressure of the race rings against the rolling bodies.

Assuming now that rotation is imparted to the shaft 13 in either direction, it is apparent that the inner end portion of the lever 4 will tend to rotate with the shaft and that, therefore, the outer end portion of the lever will tend to fulcrum at one or the other of its corners 8 or 10 against the related end face 6 or 7 of the shoe 3, and at its diagonally opposite outer corner 9 or 11 as the case may be, against the other end face of said shoe, with the result of exerting pressure in opposite directions against the end faces of the shoe and effecting further spreading of said shoe. Consequently, the inner race ring will be spread or expanded automatically upon rotation of the shaft 13 and through the resulting rocking movement of the lever 4 to impose the desired clamping pressure of said ring against the rolling bodies 2.

The arrows in Figure 2 of the drawing illustrate the action of the lever 4 in effecting automatic spreading of the shoe 3. Assuming, for example, rotation of the shaft 13 in a counter-clockwise direction, the force on the inner end of the lever 4 will be in the direction of the arrow 15. Consequently, by reason of the resulting tendency of the lever to rock, a force in the direction of the arrow 16 will be imposed on the end face 6 of the shoe 3 at the corner 8 of the lever, and a force in the direction of the arrow 17 will be imposed on the end face 7 of the shoe at the outer corner 11 of the lever, and since the forces 16 and 17 are opposite there will result a spreading of the shoe. On the other hand, if the direction of rotation of the shaft 13 is reversed, the action of the lever obviously will be reversed and spreading of the shoe will be effected by cooperation of the corners 9 and 10 of the lever against the faces 6 and 7, respectively, of the shoe. The arrow 14 indicates the direction of the force acting through the lever in the direction of the length thereof to impose the intial or normal deforming tension on the inner race ring, which force, due to the relatively small angle of inclination of the wedging surfaces of the lever and the shoe with respect to the longitudinal axis of the lever, is only a fraction of the spreading force exerted on the shoe. Therefore, the present structural arrangement including the adjusting screw 18 arranged as disclosed, is entirely practicable, it being pointed out in this connection that an angle between 8° and 16° for the cooperating inclined faces of the shoe and the lever has been found favorable, the exact angle best suited to any particular condition depending, of course, upon the materials from which the shoe and the lever are formed and the coeffiecient of friction between the cooperating faces of these parts.

Figure 3:
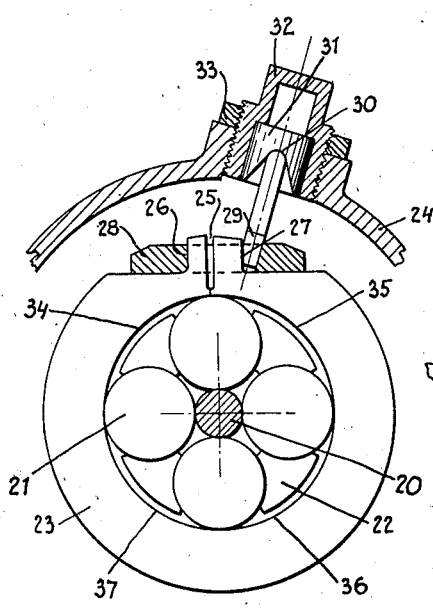
Figure 3 is a view similar to Figure 1 of an alternative embodiment of the invention.
Figure 4:
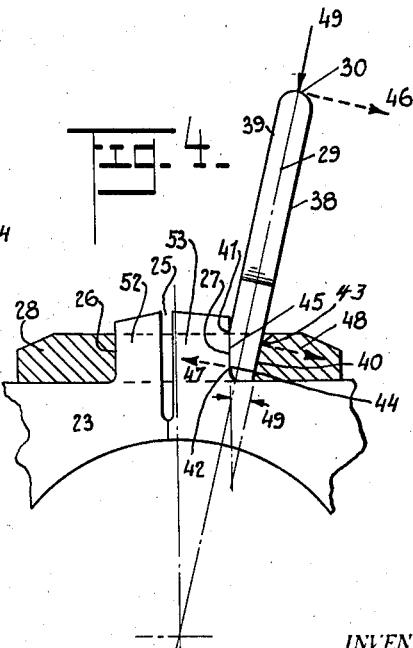
Figure 4 is a view similar to Figure 2 of the lever arrangement shown in Figure 3.

Referring now to the embodiment of the invention illustrated in Figures 3 and 4 of the drawing, wherein my present automatic ring deforming means is arranged to cooperate with the outer race ring of the gear instead of with the inner race ring thereof, as in the embodiment of my invention illustrated in Figures 1 and 2 of the drawing, the numeral 20 designates the driving shaft around and in contact with which are arranged the rolling bodies 21 carried by the cage 22, which latter is connected in a well known manner with the driven shaft (not shown). At 23 is designated the outer race ring surrounding the rolling bodies 21 and with the inner face of which said rolling bodies cooperate, while at 24 is designated, generally, the gear casing.

The race ring 23 is split as indicated at 25 and at each of the two ends thereof formed by said split is provided with an outwardly directed lug or projection which lugs or projections, designated as 52 and 53, respectively, have flat, outer parallel faces 26 and 27, respectively.

At 28 is designated a recessed yoke or frame which fits over the lugs or projections 52, 53 and which has a flat surface defining one end of the recess therein disposed flat against the outer face of one of said lugs. Defining the opposite end of said recess is a face 40 which is inclined outwardly with respect to the end face of said recess first mentioned and which is disposed in spaced relation to the outer face of the other of said lugs, forming with the outer face of the latter lug an outwardly diverging or wedge-shaped recess in which is disposed the inner end of the ring deforming lever designated as 29.

The lever 29 extends normally in a radial direction with respect to the driving shaft 20 and has one side face thereof, at the inner end at least of the lever, formed flat and straight and parallel to the longitudinal axis of the lever, this face contacting with the inclined surface 40 of the yoke 28. On the other hand, the opposite side face of the lever, at its inner end, is inclined inwardly in converging relation to the first mentioned side face of the lever, as indicated at 45, so as to contact normally flat against the outer flat face of the related yoke lug. This inclined face 45 of the lever extends from the point 41 to the related inner end corner 42 of the lever, or, in other words, the length of said face 45 is less than the thickness of the yoke 28 and less than the length of the face 27 of the related yoke lug 53, with which it contacts. On the other hand, the yoke 28 is notched from the point 43 outward so that the effective length of the lever surface which bears against the yoke surface 40; i. e., between the point 43 and the related end corner 44 of the lever, is approximately equal to the length of the inclined lever face 45.

The outer end 30 of the lever 29 is rounded and seated at the bottom of an inwardly flaring recess formed in the inner end of a plug element 31, which plug element is disposed within a hollow nut 32 in such suitable manner as not to be rotated when said nut is rotated. The nut is threaded into an opening in the gear casing 24 and is provided with a lock nut 33 for cooperation with the gear casing to secure the nut in any desired position of adjustment.

At diametrically opposite points in alinement with the split 25 in the race ring 23, the inner or rolling body engaging face of said ring is eased within the zones designated as 34—35 and 36—37, respectively. That is to say, within said zones the inner face of the race ring deviates slightly outward from a true circular path, which permits deformation of the race ring by the lever 29 to compensate for wear on the rolling bodies 21 and the related faces of the shaft 20 and the race ring, as well as to permit further deformation of said race ring to impose the desired normal and gear operating pressures of the ring against the rolling bodies.

From the foregoing it will be apparent that by rotation of the nut 32, the lever 29 may be forced longitudinally inward, with the obvious consequent result of causing the wedge-shaped inner end portion of said lever to cooperate with the faces 27 and 40 of the lug 53 and the yoke 28, respectively, to impose a contractile deforming pressure upon the race ring 23, thereby to compensate for any wear upon the rolling bodies 21, and upon the cooperating faces of the shaft 20 and the race ring, as well as to impose any desired initial or normal pressure of the race ring and the shaft 20 against the rolling bodies. Assuming, now, that the driving shaft 20 is rotated in one direction or the other, it is apparent that the rolling bodies 21 will tend to revolve with said shaft and therefore will tend to rotate the race ring 23. This obviously will result in tendency of the inner end of the lever 29 to rotate with said race ring, but since said lever is held at its outer end, the result will be that the lever will be rocked. Accordingly, depending upon the direction of rotation of the race ring 23, the lever will fulcrum at its inner end, either at the points 41, 44 against the face 27 of the lug 53 and against the face 40 of the yoke 28, respectively, or at the points 42 and 43 against said faces 27 and 40, respectively, to, in either event, impose through the lugs 52, 53 and the yoke 28, a contractile deforming pressure upon the race ring to partially or completely take up the play or easement within the zones 34—35 and 36—37 of the race ring and thereby impose the desired operating pressure of said ring against the rolling bodies 21.

To better illustrate the action of the lever 29, the arrow 49 in Figure 4 of the drawing indicates the direction of the pressure imposed on said lever by the nut 32, which pressure it will be observed is in the longitudinal direction of the lever, so that if the angularity of the cooperating wedge surfaces of the lever and the lug 53 and yoke 28 are relatively slight, only a very small force at 49 is necessary to impose a much greater deforming force upon the race ring. In this connection an angle between 8° and 16° has been found suitable for said wedge surfaces, as an angle within these limits prevents the wedge from seizing or being self-arresting, and at the same time provides for the desired increase in the race ring deforming force as compared with the adjusting force exerted by the screw 32 in the longitudinal direction of the lever, all of this depending, however, upon the nature of the materials from which the gear is formed and in particular upon the coefficient of friction between the surfaces 27 and 40 and the related lever faces.

Assuming tendency of the race ring 23 to rotate in a counter-clockwise direction according to the showing in the drawing, the arrow 46 in Figure 4 indicates the direction of the resulting force imposed on the outer end of the lever 29, while the arrows 47 and 48 indicate the direction of the race ring deforming forces imposed by the lever upon the lug 53 and the yoke 28, respectively, and transmitted through said yoke and the lugs 52, 53 to the race ring. If the tendency of the race ring should be to rotate in the opposite direction, the force 46 would be in the opposite direction to that shown and the forces 47 and 48 would be imposed at the points 41 and 44, respectively, with the same deforming action as in the first instance upon the race ring.

Although, by inward adjustment of the lever 29 the effective length of the face of said lever which contacts with the face 40 of the yoke 28 is slightly increased, this increase is so slight as to have no appreciable effect upon the operation of the gear. Moreover, by reason of the arrangement shown in Figures 3 and 4 of the drawing, it not only is possible to form the faces 26 and 27 of the lugs 52 and 53 parallel to one another, but the side faces 38 and 39 of the lever 29 may be formed parallel to one another throughout the major portion of the length of said lever, and only one of said side faces need be inclined to the axis of the lever as, for example, between the points 41 and 42. Thus, the incorporation of my improvements in a gear does not involve complicated manufacturing problems nor excessive production costs.

From the foregoing description considered in connection with the accompanying drawing, it is believed that the construction, operation and advantages of my invention will be clearly understood. It is desired to point out, however, that while I have illustrated and herein described certain specific embodiments of my invention, the same is susceptible of various modifications within the spirit and scope of my invention as defined in the appended claims.

I claim:

1. In a friction gear inclusive of rolling bodies and a cooperating race ring, a lever cooperating with said race ring and effective by longitudinal adjustments and by rocking movements thereof independently of one another to effect deformation of said ring, screw means for longitudinally adjusting said lever, and means whereby operation of the gear tends to rock the lever.

2. In a friction gear inclusive of rolling bodies and a cooperating race ring, a lever cooperating with said race ring and effective by longitudinal adjustments and by rocking movements thereof independently of one another to effect deformation of said ring, means for longitudinally adjusting said lever, and means whereby operation of said gear effects rocking of said lever.

3. In a friction gear inclusive of rolling bodies and a cooperating race ring, a split shoe within said race ring expansible to spread the latter, said shoe being in the form of a split ring having the end faces thereof where same is split converging outwardly, a drive shaft within said shoe, a lever having a wedge-shaped outer end disposed between the converging end faces of said shoe and operatively connected at its inner end with said drive shaft whereby rotation of the shaft relative to the shoe effects rocking of the lever and expansion of the shoe to deform the race ring, and means to increase the effective length of said lever to produce a wedging action of the same on the shoe to deform the ring.

4. In a friction gear inclusive of rolling bodies and a cooperating race ring, a split shoe within said race ring expansible to spread the latter, said shoe being in the form of a split ring having the end faces thereof where same is split converging outwardly, a drive shaft within said shoe, a lever having a wedge-shaped outer end disposed between the converging end faces of said shoe, and an operative connection between the inner end of said lever and said shaft whereby rotation of the shaft relative to the shoe effects rocking of the lever and expansion of the shoe to deform the race ring, said connection comprising a screw threaded into said lever at its inner end and seated against said shaft and adjustable to move the lever longitudially thereby to produce a wedging action of the lever between the shoe ends to expand the shoe and deform the race ring.

5. In a friction gear inclusive of rolling bodies and a cooperating race ring adapted to be contracted to compensate for wear and to impose pressure against the rolling bodies, a lever cooperating with said race ring and effective by longitudinal adjustment and by rocking movement thereof independently of one another to contract said ring, means for longitudinally adjusting said lever, and means whereby operation of the gear rocks said lever.

6. In a friction gear inclusive of rolling bodies and a cooperating split race ring, projections on the ends of said ring, a yoke disposed over and engaging one of said projections and spaced from the other of said projections to provide a wedge-shaped recess, an abutment, a lever fulcrumed at one end wedge-shape and against said abutment and having its other end disposed within said recess, means for adjusting said abutment to move the lever longitudinally thereby to produce a wedging action of the same within said recess to contract the race ring, said abutment and said lever being relatively disposed whereby rotation of the race ring produces a rocking movement of the lever to contract the race ring.

7. In a friction gear inclusive of rolling bodies and a cooperating split race ring surrounding said rolling bodies, outward projections on the ends of said race ring, a recessed yoke disposed over and engaging one of said projections, one end face of the recess in said yoke being spaced from the outer face of the other of said projections and cooperating with said face of said lug to provide an inwardly converging recess, an abutment, and a lever fulcrumed at its outer end against said abutment and having a wedge-shaped inner end disposed within said recess, said abutment being adjustable to move said lever longitudinally inward, one side face of said lever being straight and parallel with the longitudinal axis of the lever, and a portion of the other side only of said lever being inclined with respect to the longitudinal axis of the lever to impart the aforesaid wedge-shape to the inner end thereof.

8. In a friction gear inclusive of rolling bodies and a cooperating race ring, race ring deforming means operatively engaged with said race ring and providing a wedge-shaped recess, a lever having a wedge-shape end disposed within said recess, means for longitudinally adjusting said lever to effect wedging cooperation thereof with said means thereby to deform the race ring, and means whereby operation of the gear effects rocking of said lever and consequent cooperation of the same with said means to deform the race ring.

In testimony whereof I affix my signature.

RICHARD ERBAN.